United States Patent [19]
Arai et al.
[11] 4,426,424
[45] Jan. 17, 1984

[54] HEAT-SENSITIVE RECORDING MATERIALS

[75] Inventors: Naoto Arai, Ikeda; Takuji Tuji, Sakai; Hiroshi Yoneda, Amagasaki, all of Japan

[73] Assignee: Kanzaki Paper Mfg. Co., Ltd., Tokyo, Japan

[21] Appl. No.: 379,858

[22] Filed: May 19, 1982

[30] Foreign Application Priority Data

May 23, 1981 [JP] Japan ................................ 56-78231

[51] Int. Cl.[3] ................................................ B32B 9/04
[52] U.S. Cl. ................................... 428/411; 282/27.5; 427/150; 427/151; 428/488; 428/537; 428/913
[58] Field of Search ................ 427/150, 151; 428/913, 428/411, 488, 537; 282/27.5; 106/21, 22

[56] References Cited

U.S. PATENT DOCUMENTS

| | | | |
|---|---|---|---|
| 2,505,483 | 4/1950 | Green | 427/150 |
| 3,539,375 | 11/1970 | Baum | 428/913 |
| 3,937,864 | 2/1976 | Kohmura et al. | 427/151 |
| 4,028,118 | 6/1977 | Nakasuji | 106/21 |
| 4,097,288 | 6/1978 | Lawton | 428/913 |
| 4,219,219 | 8/1980 | Sato et al. | 106/21 |
| 4,228,222 | 10/1980 | Murakami et al. | 427/150 |
| 4,245,857 | 1/1981 | Satomura | 106/21 |
| 4,283,458 | 8/1981 | Igarashi et al. | 282/27.5 |
| 4,312,522 | 1/1982 | Yamaguchi et al. | 427/150 |

*Primary Examiner*—Norman Morgenstern
*Assistant Examiner*—Janyce A. Bell
*Attorney, Agent, or Firm*—Finnegan, Henderson, Farabow, Garrett & Dunner

[57] ABSTRACT

A heat-sensitive recording material comprised of a heat-sensitive layer on a support is disclosed. The layer comprises a colorless or pale-colored basic dye and a color developing material that, when heated, reacts with the basic dye to form a color. The color developing material is made of a compound having the general formula (I):

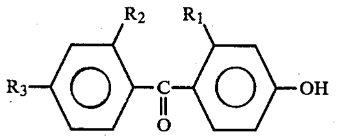

(I)

wherein $R_1$, $R_2$ and $R_3$ independently represent hydrogen or a hydroxyl group.

7 Claims, No Drawings

HEAT-SENSITIVE RECORDING MATERIALS

FIELD OF THE INVENTION

The present invention relates to heat-sensitive recording materials, and more particularly, to heat-sensitive recording materials that are suitable for use in high-speed recording and which can provide recorded images highly resistant to fading, plasticizers and water.

BACKGROUND OF THE INVENTION

Heretofore, heat-sensitive recording materials have been well known, in which colorless or pale-colored basic dyes and organic or inorganic color developers are brought into contact with each other by the application of heat to produce recorded images by utilizing the color reaction therebetween as disclosed in, for example, U.S. Pat. No. 3,539,375.

Recent remarkable advances in heat-sensitive recording systems have permitted high-speed operation of various kinds of apparatus utilizing a thermal head, such as heat-sensitive facsimiles and heat-sensitive printers. For example, modern heat-sensitive facsimiles can transmit a printed page of A4 size paper (210×297 mm) in 20 seconds, and modern heat-sensitive printers can print 120 or more letters per second. With the development of such high-speed facsimiles and printers, it is now required for heat-sensitive recording materials which are used in the high-speed facsimiles and printers to have a high recording sensitivity (dynamic recording characteristics). Furthermore, the materials must cause neither static recording within a low temperature range (60° C. to 70° C.) nor piling due to the attachment of tailings.

As the fields in which heat-sensitive recording materials are used expand, they are exposed to a greater chance of contact with plastics. This results in the recorded image undesirably losing color by reaction with the plasticizer in the plastics. To avoid this problem, the heat-sensitive recording material must have resistance to plasticizers. Furthermore, the recording material must be waterproof so that the recorded image will not lose color even if it is moistened with water. However, none of the known high-sensitivity thermal recording materials provide a recorded image that is resistant to both plasticizers and water.

SUMMARY OF THE INVENTION

Accordingly, the present inventors have made an extensive research for color developers for making a heat-sensitive recording material that is suitable for use in high-speed recording and which provides a recorded image having great resistance to plasticizers and water without compromising other features. As a result, the present inventors have found that the desired heat-sensitive recording material can be produced by using as a color developer a compound of the general formula (I):

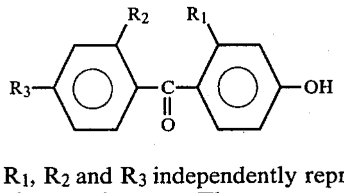
(I)

wherein $R_1$, $R_2$ and $R_3$ independently represent hydrogen or a hydroxyl group. The compound of general formula (I) is hereinafter referred to as the color developer compound of the present invention. Further studies have revealed that if the color developer compound of the present invention is used in combination with a heat-fusible material, a heat-sensitive recording material that is better suited to high-speed recording and which yet has balanced properties can be produced.

DETAILED DESCRIPTION OF THE INVENTION

The exact reason why the color developer compound of the present invention is highly suitable for use in high-speed recording and provides a recorded image resistant to plasticizers and water is not known, but presumably, the adaptivity to high-speed recording is due to the low melt-viscosity, good miscibility with dyes and high acidity of the compound. Examples of the color developer compound of the present invention include 4-hydroxybenzophenone (m.p.: 134° C.), 2,4-dihydroxybenzophenone (m.p.: 144° C.), 2,4,4'-trihydroxybenzophenone (m.p.: 200° C.) and 2,2',4,4'-tetrahydroxybenzophenone (m.p.: 201° C.), with the 4-hydroxybenzophenone and 2,4-dihydroxybenzophenone being preferred. The color developer compounds may be used alone or in combination.

It has also not been defined clearly why further improvement in the adaptivity to high-speed recording is achieved by using a heat-fusible material in combination with a color developer compound of the present invention. However, it may be that the heat-fusible material improves further the miscibility of the color developer compound of the present invention with dyes. One example of the material has the general formula (II):

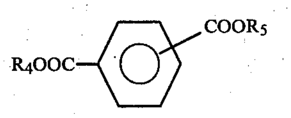
(II)

wherein the substituents are positioned at the ortho- or para-position; and $R_4$ and $R_5$ independently represent an alkyl group having 1 to 6 carbon atoms, a phenyl group or a cyclohexyl group. Specific examples of this heat-fusible material include dimethyl terephthalate (m.p. 142° C.), dicyclohexyl phthalate (m.p.: 65° C.) and diphenyl phthalate (m.p.: 75° C.), with the dimethyl terephthalate being preferred.

Another example of the heat-fusible material has the general formula (III):

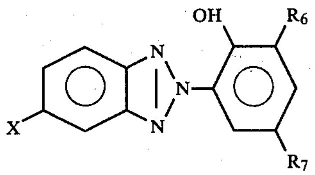
(III)

wherein $R_6$ and $R_7$ independently represent hydrogen or an alkyl group having 1 to 8 carbon atoms; and X represents hydrogen or a halogen. Specific examples include 2-(2'-hydroxy-5'-methylphenyl)benzotriazole (m.p.: 128°–133° C.), 2-(2'-hydroxy-5'-t-octylphenyl)-benzotriazole (m.p.: 102°–106° C.), 2-(2'-hydroxy-3',5'-di-t-butylphenyl)-5-chlorobenzotriazole (m.p.: 154°–158° C.), 2-(2'-hydroxy-3'-t-butyl-5'-methylphenyl)-5-chlorobenzotriazole (m.p.: 137°–142° C.), 2-(2'-hydroxy-3',5'-di-t-amylphenyl)benzotriazole (m.p.: 78°–83° C.), 2-(2'-hydroxy-3',5'-di-t-butylphenyl)-benzotriazole (m.p.: 152°–156° C.) and 2-(2'-hydroxy-5'-t-butylphenyl)benzotriazole (m.p.: 95°–100° C.), with the 2-(2'-hydroxy-5'-methylphenyl)benzotriazole being preferred.

Still another example of the heat-fusible material has the general formula (IV):

(IV)

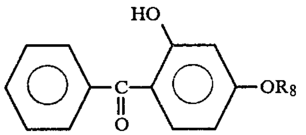

wherein $R_8$ represents an alkyl group having 1 to 12 carbon atoms or a benzyl group. Specific examples are 2-hydroxy-4-methoxybenzophenone (m.p.: 63°–64.5° C.), 2-hydroxy-4-n-dodecyloxybenzophenone (m.p.: 50° C.) and 2-hydroxy-4-benzyloxybenzophenone (m.p.: 115° C.), with the 2-hydroxy-4-benzyloxybenzophenone being preferred.

Other effective materials are 4-t-butylphenyl salicylate (m.p.: 64° C.) and ethyl-α-cyano-β,β-diphenyl acrylate (m.p.: 96° C.).

These heat-fusible materials may be used alone or in combination.

Compounds already known as heat-fusible materials in the art of heat-sensitive recording materials may also be used, and they include stearic acid amide, stearic acid methylenebisamide, oleic acid amide, palmitic acid amide, sperm oleic acid amide and a coconut fatty acid amide. However, in order to increase the adaptivity to high-speed recording without impairing the ability of the color developer compound of the present invention and provide a recorded image having high resistance to plasticizers and water, the heat-fusible materials listed specifically above are far effective as compared to these known heat-fusible materials.

Colorless or pale-colored basic dyes which can be used in the preparation of the recording layer of the heat-sensitive recording material of the present invention include triarylmethane-based dyes, e.g., 3,3-bis-(p-dimethylaminophenyl)-6-dimethylaminophthalide, 3,3-bis(p-dimethylaminophenyl)phthalide, 3-p-dimethylaminophenyl)-3-(1,2-dimethylindole-3-yl)phthalide, 3-(p-dimethylaminophenyl)-3-(2-methylindole-3-yl)phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-6-dimethylaminophthalide, 3,3-bis(2-phenylindole-3-yl)-6-dimethylaminophthalide, and 3-p-dimethylaminophenyl-3-(1-methylpyrrole-3-yl)-6-dimethylaminophthalide; diphenylmethane-based dyes, e.g., 4,4'-bis-dimethylaminobenzhydryl-benzylether, N-halophenyl-leucoauramine, and N-2,4,5-trichlorophenyl-leucoauramine; thiazine-based dyes, e.g., benzoyl-leucomethyleneblue, and p-nitrobenzoyl-leucomethyleneblue; spiro-based dyes, e.g., 3-methyl-spiro-dinaphthopyran, 3-ethyl-spiro-dinaphthopyran, 3-phenyl-spiro-dinaphthopyran, 3-benzyl-spiro-dinaphthopyran, 3-methylnaphtho(6'-methoxybenzo)spiropyran, and 3-propyl-spiro-dibenzopyran; lactam-based dyes, e.g., rhodamine-B-anilinolactam, rhodamine(p-nitroanilino)-lactam, and rhodamine(o-chloroanilino)-lactam; and fluoran-based dyes, e.g., 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-(N-ethyl-N-p-toluidino)-7-methyl-fluoran, 3-diethylamino(7-acetylmethylamino)fluoran, 3-diethylamino(7-methylamino)-fluoran, 3-diethylamino-7-(dibenzylamino)fluoran, 3-diethylamino-7-(methylbenzylamino)fluoran, 3-diethylamino-7-(chloroethylmethylamino)fluoran, 3-diethylamino-7-diethylaminofluoran, 3-(N-ethyl-N-p-toluidino)-6-methyl-7-phenylaminofluoran, 3-(N-ethyl-N-p-toluidino)-6-methyl-7-(p-toluidino)fluoran, 3-diethylamino-6-methyl-7-phenylaminofluoran, 3-diethylamino-7-(2-carbomethoxyphenylamino)fluoran, 3-(N-cyclohexyl-N-methylamino)-6-methyl-7-phenylaminofluoran, 3-pyrrolidino-6-methyl-7-phenylaminofluoran, 3-piperidino-6-methyl-7-phenylaminofluoran, 3-diethylamino-6-methyl-7-xylidinofluoran, 3-diethylamino-7-(o-chlorophenylamino)fluorans, 3-dibutylamino-7-(o-chlorophenylamino)fluoran, and 3-pyrrolidino-6-methyl-7-p-butylphenylaminofluoran. The present invention is not limited to these exemplified basic dyes. These basic dyes can be used either alone or in admixture. Particularly preferred dyes are 3-(N-cyclohexyl-N-methylamino)-6-methyl-7-phenylaminofluoran, 3-pyrrolidino-6-methyl-7-phenylaminofluoran and 3-diethylamino-6-methyl-7-phenylaminofluoran since they are highly miscible with the color developer compound of the present invention and hence provide a heat-sensitive recording material suitable for use in high-speed recording.

The proportions of the respective components in the recording layer cannot be specified because optimum conditions should be determined in consideration of the relation between the specific component and the intended effect. However, good results can be obtained using 100 to 1,000 parts by weight of the color developer compound of the present invention per 100 parts by weight of the basic dye, and it is preferable to use 100 to 500 parts by weight of the color developer compound of the present invention. If the heat-fusible material is used to achieve even higher recording sensitivity, it is used in an amount of 10 to 1,000 parts by weight, preferably 50 to 500 parts by weight, per 100 parts by weight of the color developer compound of the present invention.

Water is generally used as a dispersion medium for preparing a coating composition containing the basic dye, color developer compound of the present invention and optionally the heat-fusible material. The dye and color developer compound of the present invention are separately dispersed in water by the use of an agitator or pulverizer such as a ball mill, attritor or sand mill, and the two dispersions are mixed into a coating composition which is then applied to a support. If the heat-fusible material is used, it may be first dispersed in water and then mixed with the dispersions of the dye and color developer compound. Alternatively, the heat-fusible material may be dispersed in water together with the dye or color developer compound.

The coating composition usually contains a binder. Examples of such binders include starch, oxidized starch, esterified starch, etherified starch, other modified starches, hydroxyethyl cellulose, methyl cellulose, carboxymethyl cellulose, gelatin, casein, gum arabic, polyvinyl alcohol, styrene-maleic anhydride copolymer salts, styrene-acrylic acid copolymer salts, and styrene-butadiene copolymer emulsions. The amount of the binder used is generally from 10 to 40% by weight, and preferably from 15 to 30% by weight, based on the weight of the total solids.

The coating composition may further contain various auxiliary agents. Examples of such auxiliary agents are dispersants such as sodium dioctylsulfosuccinate, sodium dodecylbenzenesulfonate, sodium lauryl sulfate and fatty acid metal salts; defoaming agents; fluorescent dyes; and coloring dyes.

Furthermore, in order that the heat-sensitive recording material does not produce sticking upon coming into contact with a recording head, dispersions or emulsions of stearic acid, polyethylene, carnauba wax, paraffin wax, zinc stearate, calcium stearate, and ester wax can be added to the coating composition. In order to reduce the attachment of tailings to a recording head, inorganic pigments such as kaolin, clay, talc, calcium carbonate, calcined clay, titanium oxide, activated clay, and oil-absorptive pigments (e.g., kieselguhr and fine granular anhydrous silica) can be added to the coating composition.

Supports used in the preparation of the heat-sensitive recording material of the present invention include paper, plastic films and synthetic paper. The use of paper is the most preferred in view of cost and ease of coating. The paper may be neutral paper (e.g., paper made by use of a neutral sizing agent), or paper coated with a pigment such as calcium carbonate, amorphous silicon oxide, or calcined clay.

Although the amount of the coating composition to be coated on the support to prepare a recording layer is not critical, it is usually from 2 to 12 g/$m^2$, preferably from 3 to 10 g/$m^2$, on a dry weight basis. If a smooth surface is particularly needed, the recording layer formed may be smoothed by supercalendering or machine calendering.

The heat-sensitive recording material of the present invention thus produced is not only suitable for use in high-speed recording; it has great resistance to plasticizers and water without compromising other properties.

The present invention is now described in greater detail by reference to the following Examples and Comparative Example which are given here for illustrative purposes only and are by no means intended to limit its scope. All parts and percentages are by weight.

EXAMPLE 1

| Preparation of Solution A | parts |
|---|---|
| 3-(N—Cyclohexyl-N—methylamino)-6-methyl-7-phenylaminofluoran | 10 |
| 5% Aqueous solution of methyl cellulose | 5 |
| Water | 40 |

A composition made of the above ingredients was pulverized by means of a sand mill to an average particle size measured by a Coulter Counter (MODEL-TA, made by Coulter Electronics Inc.) of 3 μm. (This pulverization method is common in all of the Examples and Comparative Example.)

| Preparation of Solution B | parts |
|---|---|
| 2,4-Dihydroxybenzophenone | 20 |
| 5% Aqueous solution of methyl cellulose | 5 |
| Water | 55 |

A composition made of the above ingredients was pulverized to an average particle size of 3 μm.

Formation of Recording Layer

A mixture of 55 parts of Solution A, 80 parts of Solution B, 10 parts of a fine granular anhydrous silica [oil absorption (measured according to JIS K5101): 180 ml/100 g], 30 parts of a 20% aqueous solution of oxidized starch and 5 parts of water was stirred to prepare a coating composition. The coating composition was applied to a base paper of 50 g/$m^2$ in a dry weight of 7 g/$m^2$, and dried to prepare a sample of heat-sensitive recording paper.

EXAMPLE 2

A heat-sensitive recording paper was prepared as in Example 1 except that 2,4-dihydroxybenzophenone was replaced by 4-hydroxybenzophenone in the preparation of Solution B.

EXAMPLE 3

A heat-sensitive recording paper was prepared as in Example 1 except that 2,4-dihydroxybenzophenone was replaced by 2,4,4'-trihydroxybenzophenone in the preparation of Solution B.

EXAMPLE 4

A heat-sensitive recording paper was prepared as in Example 1 except that 2,4-dihydroxybenzophenone was replaced by 2,2',4,4'-tetrahydroxybenzophenone.

EXAMPLE 5

| Preparation of Solution A | parts |
|---|---|
| 3-(N—Cyclohexyl-N—methylamino)-6-methyl-7-phenylaminofluoran | 10 |
| 5% Aqueous solution of methyl cellulose | 5 |
| Water | 40 |

A composition made of the above ingredients was pulverized to an average particle size of 3 μm.

| Preparation of Solution B | parts |
|---|---|
| 2,4-Dihydroxybenzophenone | 20 |
| 5% Aqueous solution of methyl cellulose | 5 |
| Water | 55 |

A composition made of the above ingredients was pulverized to an average particle size of 3 μm.

| Preparation of Solution C | parts |
|---|---|
| Dimethyl terephthalate | 20 |
| 5% Aqueous solution of methyl cellulose | 5 |
| Water | 55 |

A composition made of the above ingredients was pulverized to an average particle size of 3 μm.

Formation of Recording Layer

A mixture of 55 parts of Solution A, 80 parts of Solution B, 80 parts of Solution C, 15 parts of fine granular anhydrous silica [oil absorption (measured according to JIS K5101): 180 ml/100 g], 50 parts of a 20% aqueous solution of oxidized starch and 10 parts of water was stirred to prepare a coating composition. The coating composition was applied to a base paper of 50 g/$m^2$ in a dry weight of 7 g/$m^2$ and dried to prepare a sample of heat-sensitive recording paper.

EXAMPLE 6

A heat-sensitive recording paper was prepared as in Example 5 except that dimethyl terephthalate was replaced by 2-(2′-hydroxy-5′-methylphenyl)benzotriazole in the preparation of Solution C.

EXAMPLE 7

A heat-sensitive recording paper was prepared as in Example 5 except that dimethyl terephthalate was replaced by 2-hydroxy-4-methoxybenzophenone in the preparation of Solution C.

EXAMPLE 8

A heat-sensitive recording paper was prepared as in Example 5 except that dimethyl terephthalate was replaced by 4-t-butylphenyl salicylate in the preparation of Solution C.

EXAMPLE 9

A heat-sensitive recording paper was prepared as in Example 5 except that dimethyl terephthalate was replaced by ethyl-α-cyano-β,β-diphenyl acrylate in the preparation of Solution C.

EXAMPLE 10

A heat-sensitive recording paper was prepared as in Example 5 except that 2,4-dihydroxybenzophenone was replaced by 4-hydroxybenzophenone in the preparation of Solution B.

EXAMPLE 11

A heat-sensitive recording paper was prepared as in Example 5 except that 2,4-dihydroxybenzophenone was replaced by 2,4,4′-trihydroxybenzophenone in the preparation of Solution B.

EXAMPLE 12

A heat-sensitive recording paper was prepared as in Example 5 except that 2,4-dihydroxybenzophenone was replaced by 2,2′,4,4′-tetrahydroxybenzophenone in the preparation of Solution B.

COMPARATIVE EXAMPLE

A heat-sensitive recording paper was prepared as in Example 5 except that 2,4-dihydroxybenzophenone was replaced by 2,2-bis(4′-hydroxyphenyl)propane in the preparation of Solution B and dimethyl terephthalate was replaced by stearic acid amide in the preparation of Solution C.

Using the heat-sensitive recording papers prepared in Examples 1 to 12 and Comparative Example, recording was conducted with a heat-sensitive facsimile apparatus (HIFAX 700 of Hitachi, Ltd.). The data on the recording sensitivity and resistance to plasticizer and water of the image produced by the respective samples is given in the following table.

| | (*1) Recording Sensitivity | (*2) Resistance to Plasticizer | (*3) Resistance to Water |
|---|---|---|---|
| Example 1 | 1.1 | o | o |
| Example 2 | 1.1 | o | o |
| Example 3 | 1.1 | o | o |
| Example 4 | 1.1 | o | o |
| Example 5 | 1.3 | ◎ | ◎ |
| Example 6 | 1.3 | ◎ | ◎ |

-continued

| | (*1) Recording Sensitivity | (*2) Resistance to Plasticizer | (*3) Resistance to Water |
|---|---|---|---|
| Example 7 | 1.3 | ◎ | ◎ |
| Example 8 | 1.2 | ◎ | o |
| Example 9 | 1.1 | o | o |
| Example 10 | 1.3 | ◎ | ◎ |
| Example 11 | 1.3 | ◎ | ◎ |
| Example 12 | 1.3 | ◎ | ◎ |
| Comparative Example | 0.9 | x | x |

Criteria for evaluation of resistance to plasticizer and water of the recorded image:
◎: The color density did not substantially decrease, and the image did not at all lose.
o: The color density decreased, but the image did not lose, which results in no problem in practical use.
x: The color density greatly decreased, and the image partially lost to an extent that one cannot decipher it.
(*1) The recording sensitivity is expressed by the color density of the recorded image, as measured with a Macbeth reflection densitometer, (Model RD-100R; an amber filter was used), immediately after the recording on the facsimile apparatus.
(*2) The recorded paper was brought into contact with a polyvinyl chloride film in such a manner that the recording layer was faced at the polyvinyl chloride film and 24 hours later, the recorded image was checked for any loss.
(*3) The recorded paper was dipped in water, and 24 hours later, the recorded image was checked for any loss.

The heat-sensitive recording papers obtained in the Examples of the present invention provided a recorded image having great resistance to plasticizers and water so that even when the recording papers were brought into contact with the plasticizers and water, the image did not lose as well as were good in recording sensitivity.

While the invention has been described in detail and with reference to specific embodiments thereof, it will be apparent to one skilled in the art that various changes and modifications can be made therein without departing from the spirit and scope thereof.

What is claimed is:

1. A heat-sensitive recording material, comprising:
a support;
a heat-sensitive recording layer positioned on the support, wherein the heat-sensitive recording layer comprises a colorless or pale-colored basic dye and a color developing material that, when heated, reacts with the basic dye to form a color, the color developing material being comprised of a compound having the general formula (I):

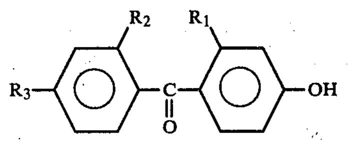

(I)

wherein $R_1$, $R_2$ and $R_3$ independently represent hydrogen or a hydroxyl group; and
a heat-fusible material selected from the group consisting of:
(a) a compound having the general formula (II):

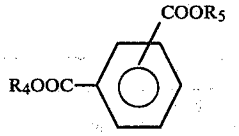

(II)

wherein the substituents are positioned at the ortho- or para- position; and $R_4$ and $R_5$ independently represent an alkyl group having 1 to 6 carbon atoms, a phenyl group or a cyclohexyl group;

(b) a compound having the general formula (III):

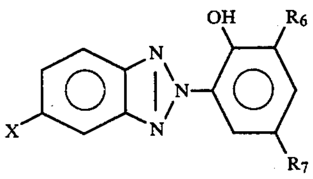

(III)

wherein $R_6$ and $R^7$ independently represent hydrogen or an alkyl group having 1 to 8 carbon atoms; and X represents hydrogen or a halogen atom; and (c) a compound having the general formula (IV):

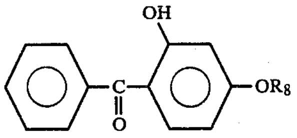

(IV)

wherein $R_8$ represents an alkyl group having 1 to 12 carbon atoms or a benzyl group.

2. A heat-sensitive recording material as claimed in claim 1, wherein said compound (I) is 4-hydroxybenzophenone.

3. A heat-sensitive recording material as claimed in claim 1, wherein said compound (I) is 2,4-dihydroxybenzophenone.

4. A heat-sensitive recording material as claimed in claim 1, wherein said compound (I) is 2,4,4'-trihydroxybenzophenone.

5. A heat-sensitive recording material as claimed in claim 1, wherein said compound (I) is 2,2',4,4'-tetrahydroxybenzophenone.

6. A heat-sensitive recording material as claimed in claim 1, wherein said heat-fusible material is comprised of 4-t-butyl-phenyl salicylate.

7. A heat-sensitive recording material as claimed in claim 1, wherein said heat-fusible material is comprised of ethyl-α-cyano-β,β-diphenyl acrylate.

* * * * *